United States Patent [19]

Seal

[11] 4,049,309
[45] Sept. 20, 1977

[54] AUTOMOTIVE VEHICLE

[75] Inventor: Michael R. Seal, Bellingham, Wash.

[73] Assignee: Board of Trustees Western Washington State College, Bellingham, Wash.

[21] Appl. No.: 655,865

[22] Filed: Feb. 6, 1976

[51] Int. Cl.$^2$ .................. B62D 35/02; B62D 37/02
[52] U.S. Cl. ................. 296/1 S; 240/7.1 H; 296/28 R; 264/219
[58] Field of Search .............. 296/1 S; 280/670; 301/63 R, 63 D

[56] References Cited

U.S. PATENT DOCUMENTS

| 2,128,686 | 8/1938 | Andreau | 296/1 S |
|---|---|---|---|
| 2,128,687 | 8/1938 | Andreau | 296/1 S |
| 2,206,202 | 7/1940 | Reid | 280/670 X |
| 2,241,755 | 5/1941 | Zaccone | 296/1 S |
| 2,955,869 | 10/1960 | Blaser | 296/1 S |
| 3,425,741 | 2/1969 | Korff | 296/1 S |
| 3,734,566 | 5/1973 | Hanley | 301/63 R |
| 3,951,222 | 4/1976 | Fletcher | 296/1 S |

Primary Examiner—Richard J. Johnson
Attorney, Agent, or Firm—Seed, Berry, Vernon & Baynham

[57] ABSTRACT

An automotive vehicle is provided with a lightweight crash-resistant honeycomb core chassis which combines structural load carrying support with lateral impact resistance. The automotive vehicle is aerodynamically efficient having a chassis and body which are inclined downwardly and forwardly to increase front downward air force. The body is smoothed to provide minimum air resistance and has a unique rearwardly diverging air guiding surface on the underside of the body. The air guiding surface reduces the velocity of air moving relative to the vehicle body and an air intake scoop is positioned at a point of high pressure along the air guiding surface but forwardly of the rear-mounted engine of the vehicle so that sufficient air pressure is available to force air into the engine compartment of the vehicle. Air leaves the rearward end of the vehicle through guiding vanes which direct the air into a low air pressure region behind the vehicle and in a direction to mix with air passing over the vehicle to reduce turbulent drag-producing air flow around the vehicle. Air drag is further reduced by providing a unique hollow wheel which is essentially free of drag producing struts or brake mechanism which brake mechanism is located within the aerodynamic efficient body of the vehicle. The hatch of the vehicle for admitting passengers is made lightweight by placing substantially all of the door latching mechanism on the body rather than in the hatch. A unique manually operated manual headlight positioning mechanism is provided to swing the headlights between an opened operable position and a closed low-aerodynamic drag position. Finally, a unique method is provided for inexpensively forming a rain gutter between a body and a hatch fitted close onto the body. The method includes forming parts of the hatch and body using a removable, easily extrusible wax dam to get an exact desired gap between the terminal edge of the hatch and the body.

8 Claims, 14 Drawing Figures

U.S. Patent  Sept. 20, 1977  Sheet 1 of 4  4,049,309
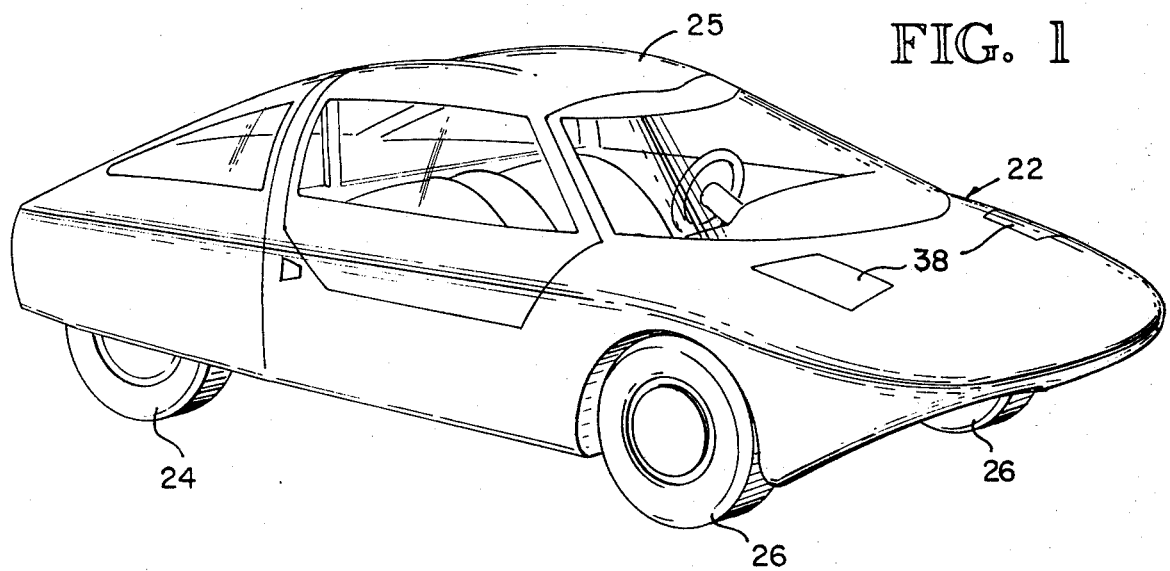
FIG. 1
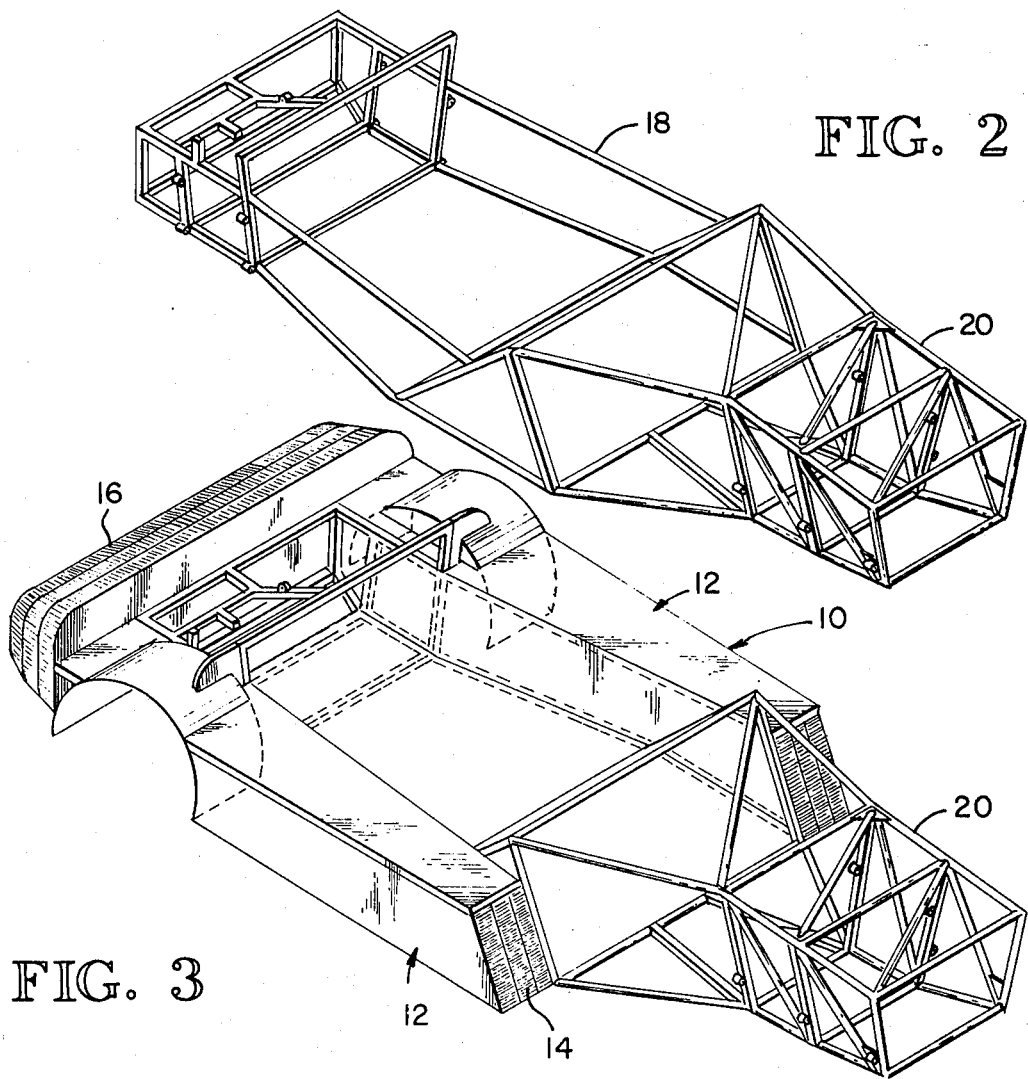
FIG. 2
FIG. 3

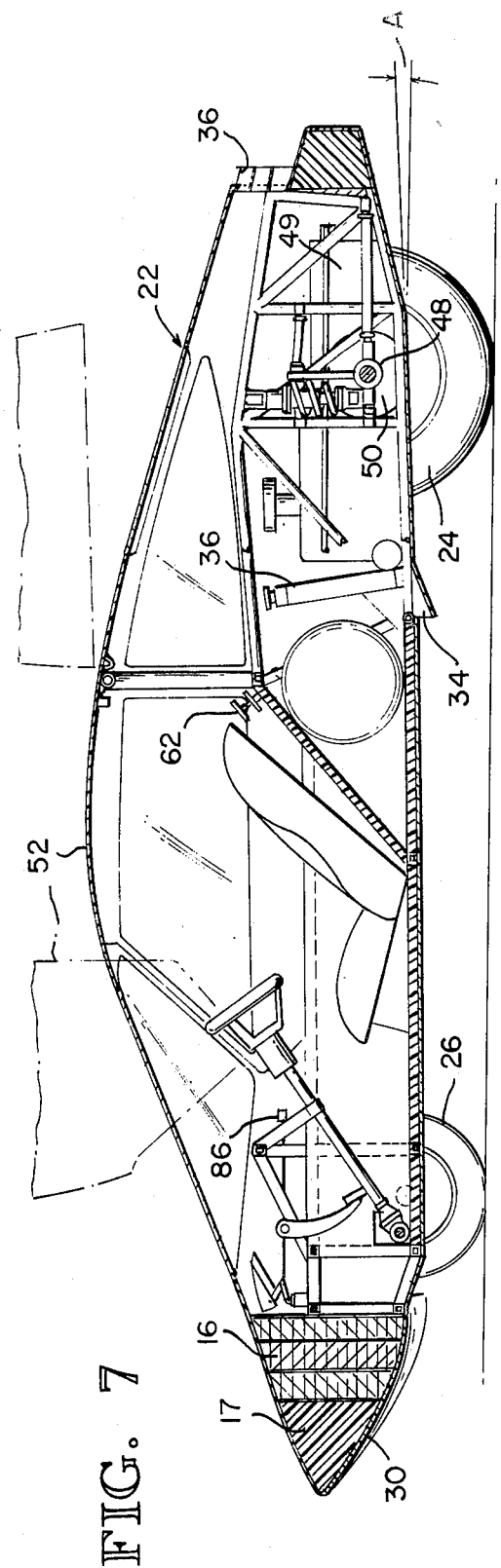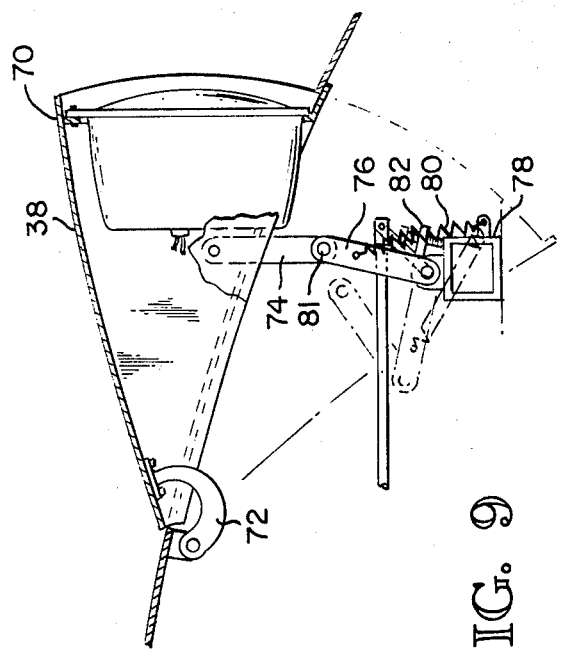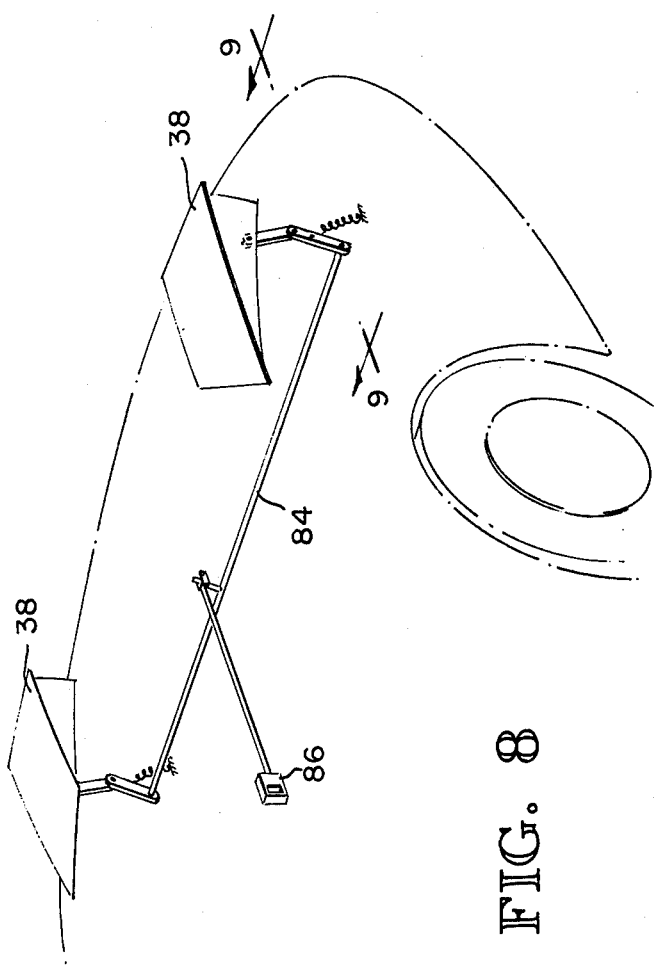

4,049,309

AUTOMOTIVE VEHICLE

BACKGROUND OF THE INVENTION

1. Field of the Invention

This invention pertains to several unique apparatuses for improving the performance of an automotive vehicle and a manufacturing method for making a rain gutter around the hatch and body of any type of object.

2. Description of the Prior Art

It is well known that presently constructed automotive vehicles are overweight and aerodynamically inefficiently designed. Air drag, for example, increases as the square of the speed. At 70mph (13Km) air drag is four times as great as at 35mph (56Km) and in typical domestic sedan at 100mph (160Km) total resistance due to aerodynamic drag is approximately 70%.

It is another known problem that to accurately provide a rain gutter gap between a movable hatch and the opening of a surrounding body requires expensive tooling and is difficult to achieve.

SUMMARY OF THE INVENTION

It is a basic object of this invention to provide improved apparatus for reducing aerodynamic drag on an automotive vehicle.

It is another object of this invention to provide an improved mechanism for positioning headlights and latching a hatch on an automotive vehicle.

It is another object of this invention to provide a method for inexpensively forming a rain gutter gap between a hatch and the opening in a surrounding body.

More specifically, an object is to provide a body and chassis inclination which increases downward pressure on the forward end of a vehicle for better front end traction.

Another more specific object is to provide an air guiding surface on the underside of an automotive vehicle body which increases the air pressure beneath the body at an air intake scoop for providing air into the rear engine compartment of the vehicle.

Still another specific object is to provide an aerodynamically efficient wheel for an automotive vehicle.

Still another specific object is to improve the door latching mechanism of an upwardly opening automotive hatch to reduce the weight of the hatch.

Still another specific object is to provide an inexpensive apparatus for positioning the swing-type headlights of an automotive vehicle.

Basically, the various objects are obtained by several unique features. One such feature is to mount the chassis of the vehicle on larger rear wheels to provide a downward inclination to the body and chassis which causes an increase of the air pressure on the forward end of the body. Secondly, the body is formed with all smoothly configured contours to reduce aerodynamic drag on the body both forwardly to rearwardly and laterally over the body. Another feature is the provision of a concave entrance and rearwardly divergent air guiding surface on the underside of the body which allows the air passing beneath the body to expand and reduce its velocity. This results in an increased pressure in the air which can be advantageously used to move air upwardly through the rear-mounted engine compartment of the body. In addition, air emitted from the engine compartment is discharged rearwardly in an optimum direction to mix with air flowing over the body and reduce turbulence and thus air drag caused by the air moving over the body. Still another feature is to move the brake mechanism inboard of the axle and shield it in the aerodynamically efficient body of the vehicle and remove the conventional wheel struts to leave a wheel rim and narrow hub which produce a significantly lower drag than in conventional automotive wheels. Still another feature is to provide the handle and linkage for latching the upwardly-opening hatch of the automotive vehicle in the body rather than in the hatch itself so that the hatch may be lengthened for ease of lifting and reducing the weight of mechanisms necessary to hold the hatch in an opened position. Still another feature of the invention is to provide a simple over-center linkage mechanism for operating the headlights position remotely from within the passenger compartment.

Finally, another feature of the invention is to provide various layup steps for forming the terminal edge of the hatch and the surrounded opening of the mating body member through the use of an easily extruded wax dam shaped to conform exactly to the desired gap between the terminal edge of the hatch and the body opening. The dam is removed during the final stages of the method and replaced by conventional weather stripping. The method advantageously allows for the inexpensive formation of accurate rain gutter gaps in any type of fiber reinforced plastic construction.

DESCRIPTION OF THE FIGURES OF THE DRAWINGS

FIG. 1 is a perspective of an automotive vehicle embodying the principles of the invention.

FIG. 2 is an isometric of a basic frame used to make the chassis of the vehicle shown in FIG. 1.

FIG. 3 is an isometric view of the chassis complete with structural load-carrying and impact-resistant honeycomb core panels forming part of the invention.

FIG. 7 is a longitudinal vertical section of the vehicle shown in FIG. 1 with parts removed for clarity.

FIG. 8 is a schematic isometric of a headlight positioning feature of this invention.

FIG. 9 is a fragmentary vertical section taken along the lines 9—9 of FIG. 8.

FIGS. 11–14 are schematic method steps illustrating the layup of the hatch and body with an accurately-sized rain gutter gap between.

FIG. 11 is the initial step showing a female mold board and gauge or guide bar.

FIG. 12 illustrates a second step in which the hatch is shaped to the mold board and guide bar.

FIG. 13 is a third step illustrating the layup of the body on the mold board and with the rain gutter gap being shaped by an extruded wax seal.

FIG. 14 illustrates the final operative configuration between the terminal edge of the hatch and the body with weather stripping in place in the rain gutter gap.

DETAILED DESCRIPTION OF THE PREFERRED EMBODIMENTS

Figure 4:
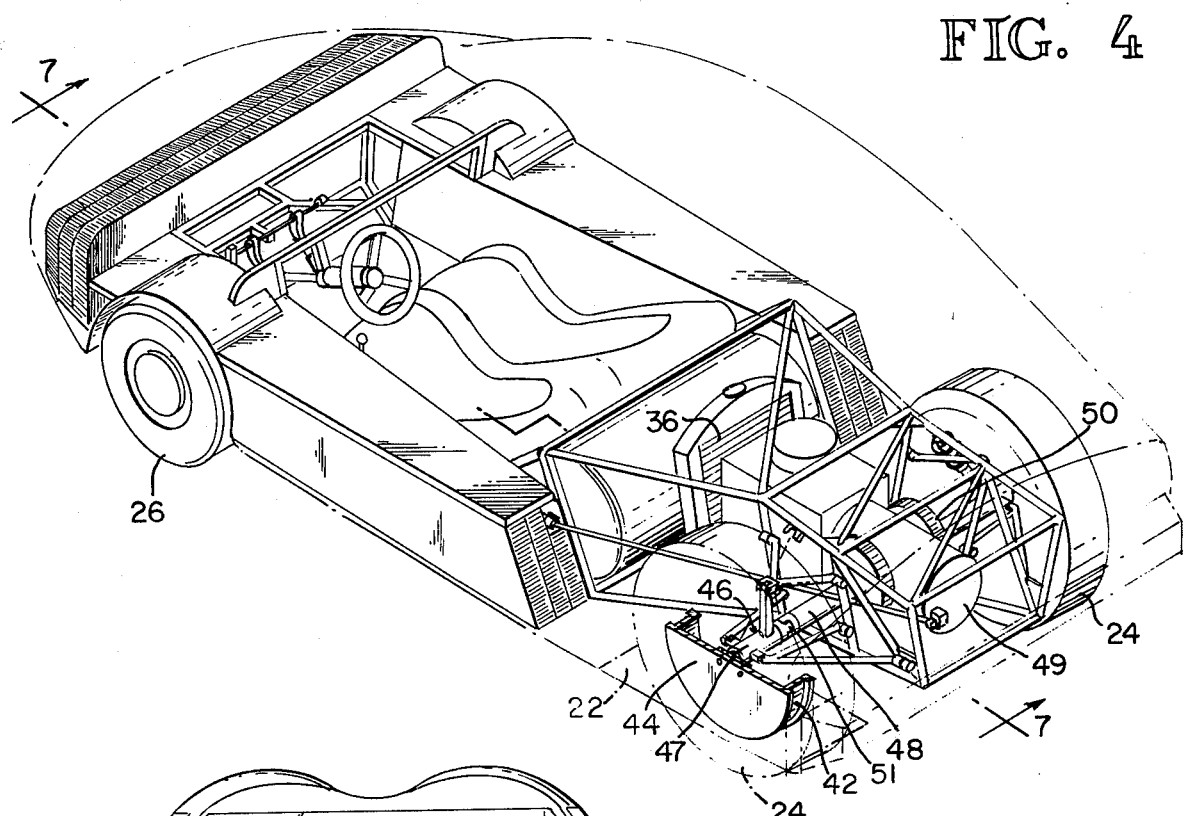
FIG. 4 is a perspective view of the vehicle shown in FIG. 1 with the body shown in phantom and parts removed for clarity.

As best shown in FIGS. 1-4 and 7, the vehicle is provided with a unique semi-monocoque chassis 10 formed in part by the novel load-carrying, impact-resisting panels 12 forming part of this invention. The panels are formed of a impact-resisting aluminum honeycomb core 14 approximately 9 inches thick wrapped with two additional layers of 6 ounce (170g) fiberglass cloth and plastic resin with an all up weight of 1400 pounds. The vehicle with such honeycomb construction should be able to withstand a 30 mile per hour crash from the lateral direction and still have the occupants survive. The honeycomb panels in addition to serving the impact-resistant function, however, uniquely serve as part of the load-carrying chassis and thus substantially reduce the weight of the vehicle over conventional construction. The height of the honeycomb side panels are limited to the required statutory height presently of 20 inches. A front honeycomb panel 16 forms the forward end of the chassis.

Figure 14:
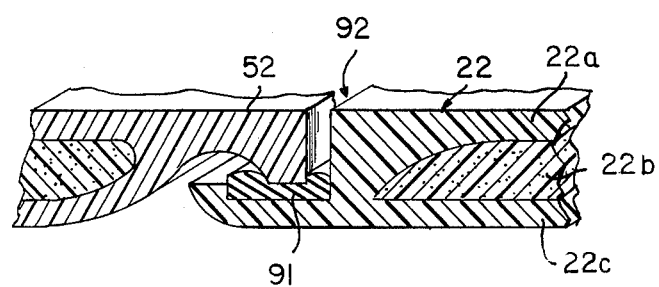

The monocoque design also includes a conventional deformable front bumper 17 and a tubular space frame 18 including a rear engine frame 20 made from ¾ inch diameter thin-wall steel tubing. The body 22 and hatch comprises an outer layer of glass fiber reinforced plastic 22a, an intermediate layer of rigid structural foam material 22b and an inner layer of glass fiber reinforced plastic 22c (FIG. 14). The vehicle body and bumper are coated with a cross-linked acrylic polyurethane material which is abrasive resistant elastic and compatible with the elastomeric urethane front bumper.

A second unique feature of the invention is its aerodynamically efficient body design. The vehicle body 22 is best shown in FIGS. 1,5,6 and 7 and includes a plan section rearwardly tapering which forces a crab track configuration. The rear wheels 24 are enclosed within the body. The rear wheels are also of a narrower track than the front wheels and are of a larger diameter to give the vehicle about a 3° forward and downward rake. A double hump 25 for the occupants' heads allows minimum frontal area. All glass is fitted completely flush with the body to improve air flow. There is no radiator opening in the front. Rather it is a unique feature of this invention that the underside 28 of the body is provided with a concave forward end 30 that leads into a rearwardly diverging air guiding surface 32. As the surface diverges, the velocity of the air passing along the air guiding surfaces becomes substantially reduced and builds increases in air pressure. An air intake scoop 34 is positioned at a point of high pressure and directs the pressurized air in through the engine compartment of the vehicle 20 past the radiator 36 for cooling and is used as the air for a combustible mixture in the enging. Excess air is guided outwardly through air ducts or ports 36 (FIG. 7) into a low-pressure air region behind the vehicle. The air is guided into the low-pressure air region and mixes with turbulent flow passing up from the underside of the vehicle and down from the top of the vehicle. The mixing of the air through the ports 36 shifts the laminar flow rearwardly so that drag-producing turbulent flow occurs further to the rear of the automobile. An optimum design to achieve full laminar flow above and below the body. This is not possible but it is possible to maintain non-stalled flow over the main body surfaces.

A boundary layer sticks to the body and is moved, on a well-shaped body, in the direction of general flow by the adjacent layer of air. In the front, the pressure head from convex curvature of the streamlines moving over the body moves the boundary layer in the direction of general flow or toward areas of low pressure while at the rear of the vehicle the pressure head causes counterflow on the boundary layer. This boundary layer comes from friction turbulence as the air flows along the body. The streamlines are less convex in the rear than in the front. The pressure on the front prevails over the pressure in the rear and the body has "form drag". Form drag is due to the disturbances or wake created behind the vehicle. When the pressure head from the rear causes a backward flow of the boundary layer, a separation of the flow from the surface occurs. This flow separation is in the form of a turbulent wake behind the car. A streamline shape, of course, has a very low form drag.

Another type of drag is frictional drag. This is friction within the air and between the air and the body in the boundary layer. The combined form drag and frictional drag are the air drag or flow resistance of the body. The form drag is reduced by the shape of the front of the vehicle which causes minimal bending of the streamlines. Thus, the windshield, the belly, the top and sides of the body are shaped to avoid flow separation on the body. The sides and top have a moderate taper. The underside of the body is made as smooth as possible. The rear of the body is shaped so that the final flow separation is from the smallest possible area. Using these design features as shown in the vehicle in the drawings, experimental scale models in wind tunnel tests resulting in drag figures less than half of those of domestic subcompact cars. In addition, attention is given to aesthetic appearance of the vehicle by shaping the contours in a pleasing symmetrical arrangement and flush smooth transitions between all connected surfaces.

Figure 5:
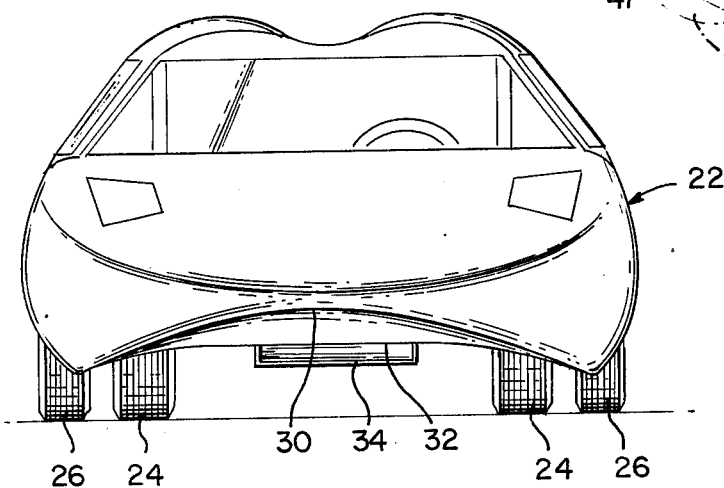
FIG. 5 is a front elevation of the vehicle shown in FIG. 1.
Figure 6:
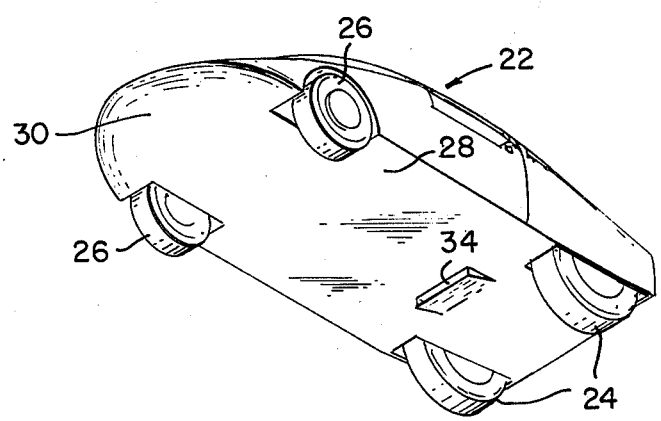
FIG. 6 is an isometric of the vehicle shown in FIG. 1 looking at the underside of the vehicle.

The plan shaped of the vehicle, as best shown in FIGS. 4 and 5 is to increase the transverse cross-sectional area of the vehicle from zero at the very front to a maximum at the passenger location then reduced so there is minimal flow separation. The rear deck slope and side angles are not more than 10 degrees. Air intakes and internal ducts are eliminated by providing air intake solely through the scoop 34.

To further reduce aerodynamic drag, the headlights 38, door handles 40, rain gutters 92, license plates, sun visors, externally-mounted mirrors, molding and trim steps have either been eliminated or made flush with the body to reduce the drag. The molding that usually surrounds windows was completely eliminated providing for an uninterrupted smooth surface. As best shown in FIG. 4, aerodynamic drag caused by the wheel structures is also reduced. Each wheel includes a rim 42 having a central thin hub 44. The hub extends substantially less laterally than does the rim. An axle 46 is bolted to the hub 44 by bolts 47. The axle is connected to an intermediate axle portion 48 by a universal coupling 51. The axle portion 48 is connected to the engine 49 in a conventional manner and inboard brakes of a conventional construction 50 on the transaxle are used for braking. As is clearly illustrated, the wheel is of simplistic design reducing air drag. The wheel sits in a well in the body with the universal couplings and braking mechanism housed out of the air flow in the well and within the aerodynamically efficient body 22.

Figure 10:
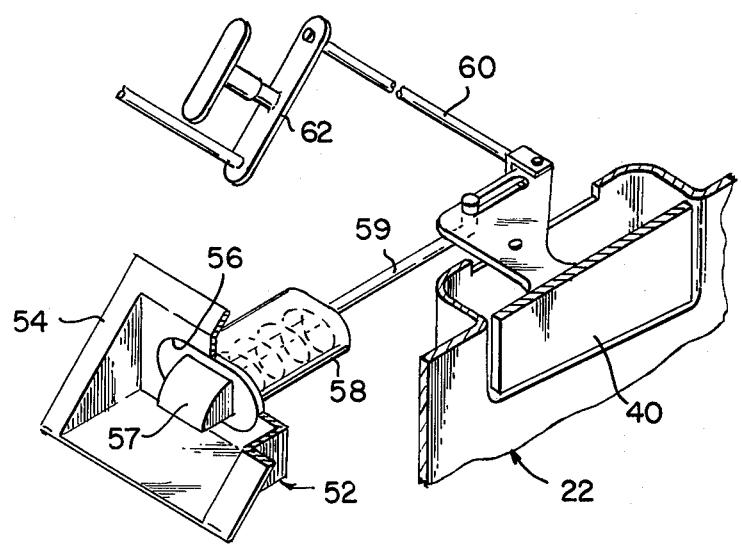
FIG. 10 is a fragmentary isometric illustrating the latching mechanism for the hatch of the vehicle shown in FIG. 1.

As best shown in FIG. 10, another unique feature of the invention is the door latching mechanism which holds the upwardly movable hatch 52 for the passenger compartment in a locked condition. Preferably, the hatch includes a metal housing 54 provided with a slot 56 to receive a spring-biased dog or pawl 57. The pawl is mounted in a bracket 58 which is connected through linkage 59 to the handle 40 which is pivotally mounted in a recess in the body 22 and through a set of intermediate links 60 connects to a central handle 62. Pivotal movement of the handle will move the bracket 58 and thus the pawl 57 out of the recess or slot 56 allowing the hatch to be opened. This movement of one side handle is transmitted through the central handle 62 to unlatch simultaneously the latch on the opposite side of the hatch. Alternatively, the hatch can be opened from the interior of the passenger compartment from either side of the compartment by turning the central handle 62. By eliminating all of the linkages illustrated from the hatch, the hatch ends up of lightweight construction and can be held in the open position illustrated in FIG. 7 by lightweight springs or pressurized gas struts of the Datsun B-10 design, not shown.

Another unique feature of the invention is the mechanism for controlling the position of the headlamps 38. As best shown in FIGS. 8 and 9, each headlamp 38 is provided with a cover or housing 70 which in the closed position is flush with the top surface of the body. The housing is pivotally connected to the body by a hinge 72. The headlamp is opened and closed and is held in such positions automatically by a unique over-center spring mechanism. This mechanism includes a first link 74 pivotally coupled at one end to the headlight housing 70 and at its other end to a second link 76. The second link is connected at its opposite end to a pivot mounting block 78. A spring 80 is pivotally connected to the second link such that when the headlamp is in the opened position, the spring pulls the center pivot 81 of the two links forwardly beyond the center of alignment between the pivotal axes of the two links and pulls the second link against an adjustable stop 82 to restrain further movement. Adjustment of the stop determines the height of the housing and thus the height of the beam direction. The over-center position of the spring and linkages holds the headlamp in the open position once the position is established. To close the headlamp, the links are moved into the phantom line position shown in FIG. 9 with the spring 80 moving counterclockwise of the lower pivot of the second link 76. This over-center position holds the headlamp in a closed position. The links are moved to overcome their over-center positions by a linkage 84 connected to a handle 86 located in the passenger compartment.

Figure 11:
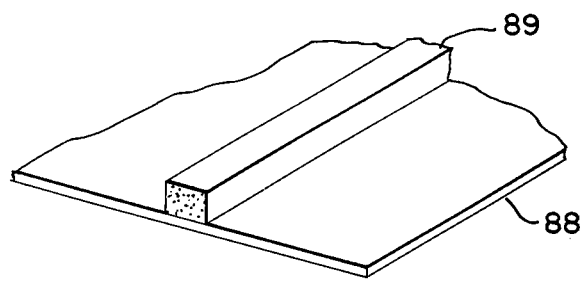
Figure 12:
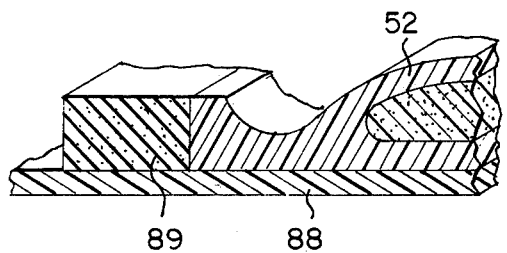
Figure 13:
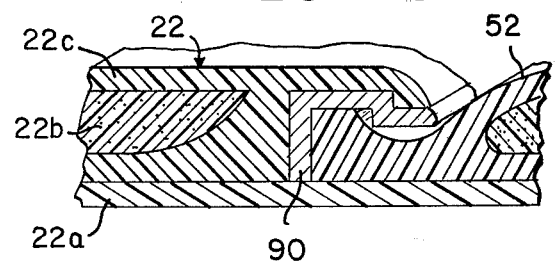

Still a final feature of the invention is the unique method by which the rain gutter is formed between the hatch 52 and the body 22 without the use of expensive tooling. As best shown in FIG. 11, the layup of the components is done on a female mold or mold board 88 to which is mounted a guide bar 89. The hatch 52 is first laid up with its terminal edge and desired shape matching the guide bar 89 and mold board 88. The terminal edge surface is then ground smoothly to the shape of the guide bar 89. Next, the guide bar is removed and the body 22 is layed up on the mold board. Prior to laying it up, however, an extrudable wax commercially available is extruded through a die, not shown, shaped identical to the cross-section of the final gap that is desired to be formed between the hatch and the body. The die is layed on the mold board flush with the terminal edge of the hatch as shown in FIG. 13 and the body is then layed up around the wax dam 90. After the plastic has cured, the hatch and body are separated and the dam is replaced by standard weather stripping 91. The finished configuration thus provides a gap 92 exactly the shape of the dam 90 with the entire laying up procedure requiring very little time other than the curing time.

While the preferred embodiments of the invention have been illustrated and described, it should be understood the variations will be apparent to one skilled in the art without departing from principles herein. Accordingly, the invention is not to be limited to the specific embodiments illustrated.

The embodiments of the invention in which a particular property or privilege is claimed are defined as follows:

1. An aerodynamically efficient structure for an automobile vehicle comprising:
   a chassis,
   forward and rearward wheels supporting the chassis, a body enclosure carried on said chassis, said body enclosure having an underside, and a downwardly and forwardly inclined, uninterrupted smooth top surface including a front closue, windshield and passenger compartment, and a rearwardly and downwardly inclined rear closure.
   said rearward wheels each having a diameter greater than the forward wheel and connected to said chassis so as to provide a forwardly and downwardly inclined slope to the chassis and underside of the body enclosure whereby the entire chassis and body enclosure has an inclination to increase downward pressure on the vehicle forward end and reduce aerodynamic drag, 2. The structure of claim 1, said chassis and body enclosure having a general inclination of about 3°.

3. An air intake for a rear engine mounted vehicle of the type comprising a chassis, wheels supporting the chassis and a body enclosure having a forward passenger compartment and a rear engine compartment and including a generally smooth underside, the improvement comprising said underside having a rearwardly diverging air guiding surface for increasing air pressure against the underside and an air intake opening in the underside at a location thereon of high air pressure for forcing air in through said air intake to be utilized by said rear engine, and an air outlet in the body enclosure at a lower pressure area for discharging excess air not utilized by said rear engine and for providing an engine air cooling flow path.

4. The vehicle of claim 3, said air outlet lying vertically higher in the body enclosure than the air intake opening for providing an increase in air circulation by rising from heating along the air cooling flow path because of increase in temperature of the cooling air from engine heat.

5. The vehicle of claim 4, further including a scoop extending downwardly at the air intake opening below the underside of the body enclosure for guiding additional air into the air intake opening.

6. An aerodynamically efficient structure for an automobile vehicle comprising:
   a chassis,
   forward and rearward wheel supporting the chassis, a body enclosure carried on said chassis,
   said body enclosure having a smooth underside, and a downwardly and forwardly inclined, uninterrupted smooth top surface including a front closure, windshield and passenger compartment, and a rearwardly and downwardly inclined rear closure.

said underside having an upward and rearward slope relative to the ground surface for reducing the velocity of the air passing between the road surface and the underside to increase air pressure, an air intake duct located in the underside at an area of high air pressure so as to induce an air flow into the body enclosure, and an air discharge passage at a low pressure area.

7. The vehicle of claim 6, said rearward wheels each having a diameter greater than the forward wheels and connected to said chassis so as to provide said rearward and upward inclination to said underside.

8. The structure of claim 7, said chassis and body enclosure having a general inclination of about 3° relative to the ground surface.

* * * * *